US010035404B2

(12) United States Patent
Patel et al.

(10) Patent No.: US 10,035,404 B2
(45) Date of Patent: Jul. 31, 2018

(54) THERMOSTATICALLY-CONTROLLED MULTI-MODE COOLANT LOOPS

(71) Applicant: FORD GLOBAL TECHNOLOGIES, LLC, Dearborn, MI (US)

(72) Inventors: Upendra J. Patel, Canton, MI (US); Ranganathan Madhavan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1689 days.

(21) Appl. No.: 13/651,795

(22) Filed: Oct. 15, 2012

(65) Prior Publication Data

US 2014/0103128 A1    Apr. 17, 2014

(51) Int. Cl.
*B60H 1/03* (2006.01)
*B60H 1/00* (2006.01)
*F01P 3/20* (2006.01)
*B60H 1/14* (2006.01)

(52) U.S. Cl.
CPC ......... *B60H 1/00885* (2013.01); *B60H 1/143* (2013.01); *F01P 3/20* (2013.01); *F01P 2060/08* (2013.01)

(58) Field of Classification Search
CPC .................................. B60H 1/00885
See application file for complete search history.

(56) References Cited

U.S. PATENT DOCUMENTS 3,170,508 A * 2/1965 Avery ........................ F24F 3/08
165/221
5,123,594 A * 6/1992 Humburg .................. F01P 3/20
237/12.3 B
6,032,869 A    3/2000 Ito et al.
6,105,876 A    8/2000 Henrich et al.
6,213,233 B1   4/2001 Sonntag et al.
6,454,180 B2 * 9/2002 Matsunaga ........ B60H 1/00485
237/12.3 B
6,569,550 B2 * 5/2003 Khelifa .................. B60H 1/143
429/434
6,584,941 B2 * 7/2003 Richter .................... F01P 7/167
123/41.1

(Continued)

FOREIGN PATENT DOCUMENTS

DE    3502817 A *    7/1986

*Primary Examiner* — Kenneth Rinehart
*Assistant Examiner* — Phillip E Decker
(74) *Attorney, Agent, or Firm* — Vichit Chea; MacMillan, Sobanski & Todd, LLC

(57) ABSTRACT

A heat transfer system is provided for a road vehicle having a passenger cabin. A primary branch includes a primary pump and a primary power plant. An auxiliary branch includes an auxiliary coolant pump, an auxiliary heat source, and a cabin heat exchanger. A thermostatic multi-way valve directs coolant from a valve inlet to substantially only a first valve outlet when receiving coolant below a first temperature. The valve directs coolant from the valve inlet to substantially only a second valve outlet when receiving coolant above a second temperature. The valve inlet is coupled to receive coolant from either the primary branch or the auxiliary branch. The first valve outlet is configured to return coolant to the same branch as is connected to the valve inlet. The second valve outlet is configured to direct coolant to the other branch to which the valve inlet is not connected.

19 Claims, 10 Drawing Sheets

(56) References Cited

U.S. PATENT DOCUMENTS

| | | | |
|---|---|---|---|
| 6,607,142 B1 | 8/2003 | Boggs et al. | |
| 6,640,889 B1 * | 11/2003 | Harte | B60H 1/00885 |
| | | | 237/12.3 B |
| 7,007,856 B2 | 3/2006 | LaFalce et al. | |
| 7,069,880 B2 * | 7/2006 | Hutchins | F01P 7/165 |
| | | | 237/12.4 |
| 7,128,025 B1 * | 10/2006 | Westhoff, Jr. | F01P 3/202 |
| | | | 123/41.01 |
| 7,249,575 B2 * | 7/2007 | Pottie | F01P 7/165 |
| | | | 123/41.1 |
| 7,263,954 B2 | 9/2007 | Piddock et al. | |
| 7,392,769 B2 * | 7/2008 | Heldberg | F01P 7/165 |
| | | | 123/41.1 |
| 2003/0230443 A1 | 12/2003 | Cramer et al. | |
| 2004/0050944 A1 | 3/2004 | Matsunaga et al. | |
| 2009/0056351 A1 | 3/2009 | Dame et al. | |
| 2009/0261176 A1 * | 10/2009 | Major | B60H 1/00885 |
| | | | 237/12.3 B |
| 2009/0283604 A1 | 11/2009 | Martinchick et al. | |
| 2009/0311565 A1 * | 12/2009 | Ishikawa | B60H 1/00885 |
| | | | 429/413 |
| 2009/0317676 A1 | 12/2009 | Andreas-Schott et al. | |
| 2009/0321533 A1 * | 12/2009 | Bigler | B60H 1/00885 |
| | | | 237/12.3 B |
| 2011/0094707 A1 * | 4/2011 | Schwartz | F01P 7/167 |
| | | | 165/41 |
| 2012/0103283 A1 | 5/2012 | Mehring et al. | |
| 2012/0145804 A1 | 6/2012 | Ishii et al. | |
| 2012/0183815 A1 | 7/2012 | Johnston et al. | |
| 2015/0298523 A1 * | 10/2015 | Patel | B60H 1/00778 |
| | | | 237/2 A |
| 2015/0362268 A1 * | 12/2015 | Maeda | B60H 1/00885 |
| | | | 165/294 |

\* cited by examiner

THERMOSTATICALLY-CONTROLLED MULTI-MODE COOLANT LOOPS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to an integrated engine cooling and cabin heating system for transportation vehicles, and, more specifically, to a method and apparatus for circulating coolant.

Historically, transportation vehicles powered by combustion engines have produced sufficient waste heat from the combustion to supply all the needed heat for warming the passenger cabin during cold weather. Considering regulations and marketplace demand for higher fuel economy and lower emissions, the global automotive market is rapidly evolving to require alternative fuel vehicles and higher efficiency (lower waste heat) engines. Modern energy-efficient vehicles such as battery electric, hybrid, fuel cell, diesel engine, small displacement petrol engine vehicles pose challenges for cabin heating. In many cases an auxiliary heating device such as fuel-operated heater, a positive temperature coefficient (PTC) coolant heater, or an exhaust heat recovery system is utilized to raise the temperature of the coolant fluid that flows to the cabin heat exchanger (i.e., heater core). Plug-in hybrid vehicles in particular require an auxiliary heating device since the combustion engine is off and cannot generate heat during times that vehicle propulsion is provided by the battery-powered systems.

To provide warmed coolant to a cabin heat exchanger under all operating modes of the vehicle propulsion or powertrain system, a reconfigurable coolant loop is known that uses electronically-controlled valves to either bypass or include the combustion engine or other components in the active coolant flow depending on whether they are active. In one example of a cooling system architecture, coolant flow can be configured as either two (dual) loops for auxiliary-based cabin heating or one combined loop for engine-based heating. The first loop may include the primary energy source (power plant), a primary coolant pump, and other primary heat exchange devices (e.g., radiator or other heat sinks, deaeration device, oil coolers/heaters, EGR cooler, or turbocharger intercooler). The second loop may include the auxiliary heating device, cabin heat exchanger, and an auxiliary coolant pump. This dual loop configuration allows the auxiliary heating device to provide cabin heating using less energy and more quickly since a smaller mass of coolant is being pumped and heated and since none of its heat is lost to the primary power plant or its associated devices.

Conventional systems have required expensive electrical diverter valve(s), mounting brackets, fasteners, wiring, connectors, fusing, electronic controller, and/or software development in order to satisfy the functions of determining which mode to operate the coolant circuit and actually diverting the flow as required. It would be desirable to provide more cost effective solutions for the control and diversion of the coolant flow.

SUMMARY OF THE INVENTION

The heat transfer system of the present invention employs a multi-way (e.g., two-position three-way) mechanical thermostatic diverter valve and in some embodiments a check valve in a manner that avoids the need for electronic controllers or actuators. The vehicle prime energy source can be a combustion engine or fuel cell, for example. The auxiliary heating device can be a fuel operated heater, positive temperature coefficient (PTC) coolant heater, or exhaust heat recovery system. The coolant circuit operates in a mixed loop mode configured such that coolant flows in a common circuit including the prime energy source and pump, auxiliary heating device, and the cabin heat exchanger. An isolated loop mode is configured such that coolant flow is separated into two circuits by the thermostatic diverter valve. One isolated circuit includes the prime energy source, the primary coolant pump, and other associated heat sink or deaeration devices. The second isolated circuit includes the auxiliary heating device, cabin heat exchanger, and an auxiliary coolant pump. The thermostatic diverter valve sealing surface is mechanically actuated, typically by a material exhibiting displacement proportional to temperature or a phase change such as wax, possibly having additional spring(s) for resistance and/or calibration. Depending on the location of the thermostatic diverter valve, a check valve may be utilized to force the flow through the auxiliary heating device and cabin heat exchanger. In addition, a dual temperature sensing and adaptive control valve is disclosed.

In one aspect of the invention, a heat transfer system is provided for a road vehicle having a passenger cabin, wherein a coolant circulates within the system. A primary branch includes a primary coolant pump and a primary power plant that heats the coolant to a primary temperature. Coolant is pumped through the primary power plant by the primary coolant pump. An auxiliary branch includes an auxiliary coolant pump, an auxiliary heat source, and a cabin heat exchanger, wherein the auxiliary heat source selectably transfers heat to the coolant flowing within the auxiliary branch. Coolant flowing within the auxiliary branch has an auxiliary temperature. A thermostatic multi-way valve having a valve inlet as well as first and second valve outlets directs coolant from the valve inlet to substantially only the first valve outlet when receiving coolant at below a first temperature. The valve directs coolant from the valve inlet to substantially only the second valve outlet when receiving coolant at above a second temperature. The valve inlet is coupled to receive coolant from either the primary branch or the auxiliary branch. The first valve outlet is configured to return coolant to the same branch as is connected to the valve inlet. The second valve outlet is configured to direct coolant to the other branch to which the valve inlet is not connected.

DETAILED DESCRIPTION OF PREFERRED EMBODIMENTS

Figure 1:
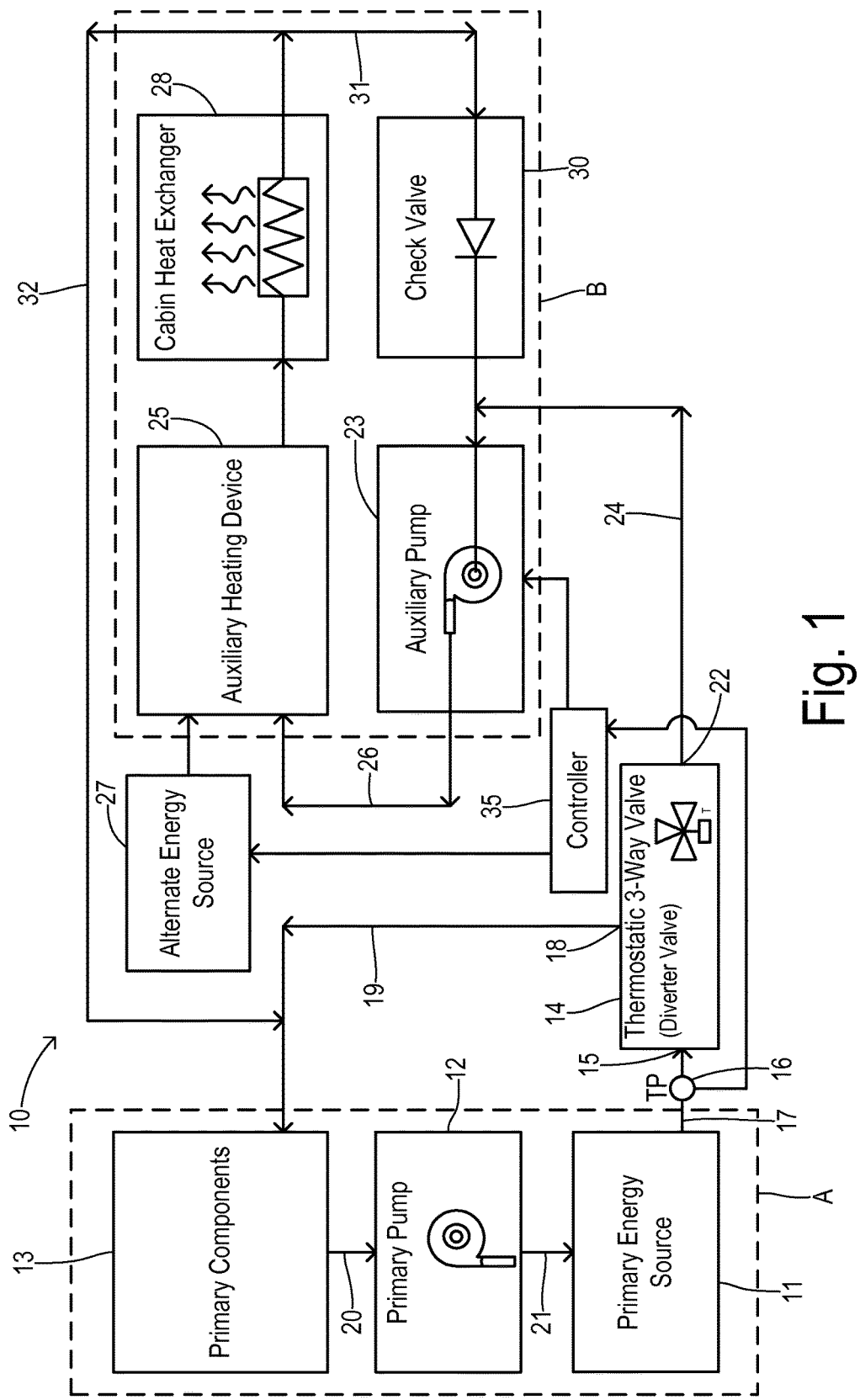
FIG. 1 is a block diagram of a heat transfer system according to a first embodiment of the invention.

Referring to FIG. 1, a heat transfer system 10 of the present invention includes a primary energy source or power plant 11 (such as an internal combustion engine, fuel cell, or battery pack) receiving coolant via a circuit including a series connection with a primary coolant pump 12. The coolant circuit further includes primary heat exchange components 13 such as a radiator, deaerator, transmission or engine oil coolers or heaters, an EGR cooler, and/or heat exchange components associated with a turbocharger, for example. Primary energy source 11, primary pump 12, and primary components 13 form a primary branch A of system 10.

A thermostatic three-way valve 14 has an inlet 15 receiving coolant from primary branch A (preferably from primary energy source 11). An optional temperature sensor 16 measures a primary temperature TP of the coolant flowing in a coolant conduit 17 from primary energy source 11 to inlet 15. Thermostatic valve 14 has a first outlet 18 coupled to primary components 13 via a conduit 19. Conduits 20 and 21 couple primary pump 12 to the primary heat exchange components 13 and the primary energy source 11, respectively.

Thermostatic valve 14 has a second outlet 22 coupled to an inlet of an auxiliary pump 23 via a conduit 24. The outlet of auxiliary pump 23 is coupled to an auxiliary heating device 25 via a conduit 26. Heating device 25 may be a PTC heater, fuel-operated heater or other portable device which supplies heat powered by an alternate energy source 27 (such as a battery for a PTC heater or liquid fuel for a fuel-operated heater). The outlet of auxiliary heating device 25 is coupled to the inlet of a cabin heat exchanger 28 which is preferably disposed with a conventional blower for transferring heat energy from the coolant to the passenger cabin as known in the art. The outlet of cabin heat exchanger 28 is coupled to the inlet of a one-way check valve 30 via a conduit 31. The outlet of check valve 30 is coupled to the inlet of auxiliary pump 23. Auxiliary pump 23, auxiliary heating device 25, cabin heat exchanger 28 and check valve 30 form an auxiliary branch B of system 10.

The outlet of cabin heat exchanger 28 is also coupled to the inlet of primary components 13 via a conduit 32 to provide for the return of coolant to primary pump 12 when in a mixed loop mode as described below. A controller 35 may receive optional temperature signal TP from sensor 16 to activate alternate energy source 27, auxiliary heating device 25, and auxiliary pump 23 as appropriate when temperature signal TP indicates that inadequate waste heat is available from primary energy source 11 to generate sufficient heat at cabin heat exchanger 28. There is no need, however, to connect controller 35 to thermostatic valve 14 since the present invention achieves optimal coolant flow without requiring electronically controlled valves.

Figure 2:
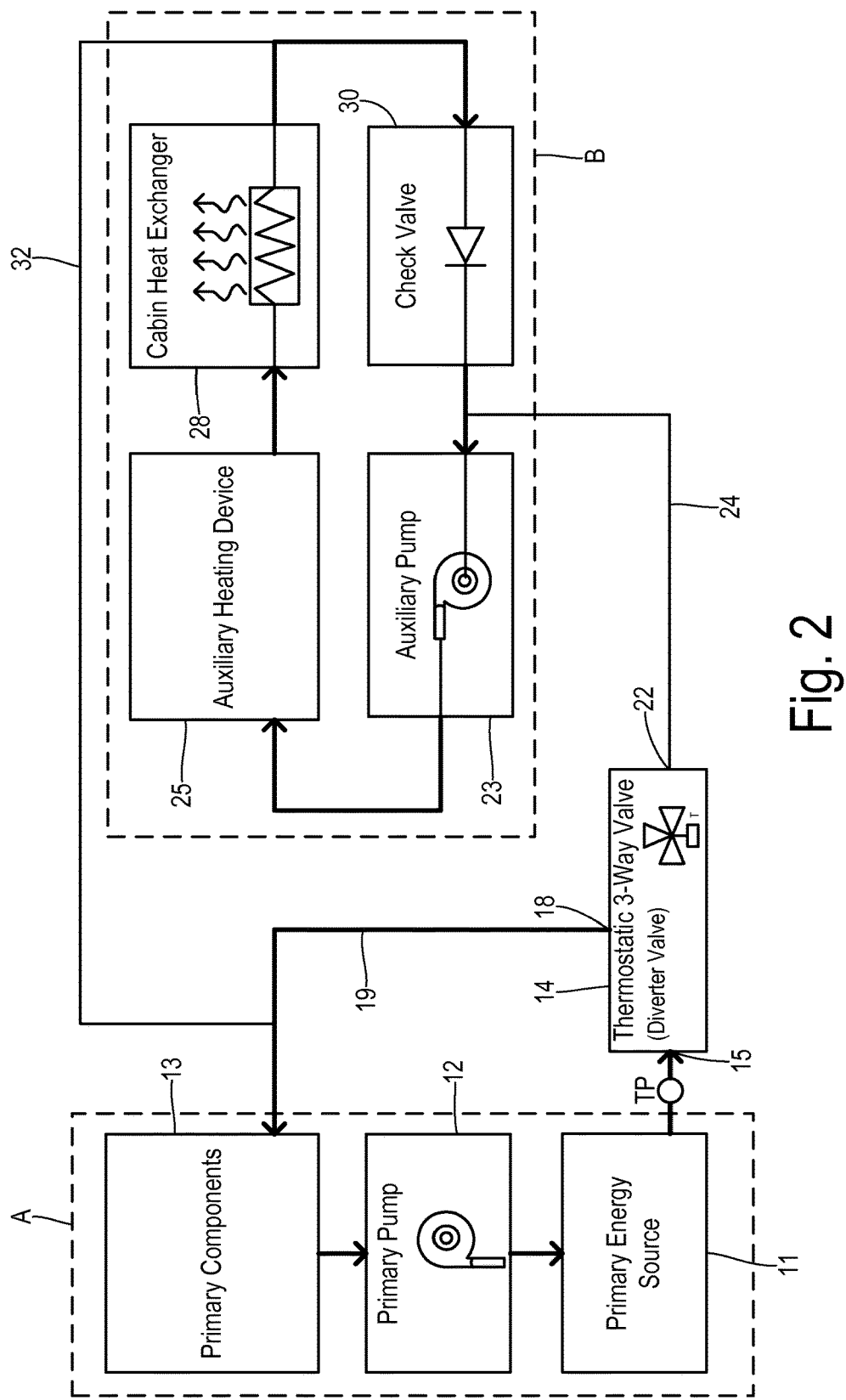
FIG. 2 illustrates coolant flow in an isolated loops mode for the embodiment of FIG. 1.

FIG. 2 shows operation of this first embodiment in an isolated loops mode that occurs when primary energy source 11 insufficiently heats the coolant. Thermostatic valve 14 is configured to direct coolant from inlet 15 to substantially only first outlet 18 when the coolant received at inlet 15 is below a first setpoint temperature. On the other hand, valve 14 directs coolant from inlet 15 to substantially only second valve outlet 22 when receiving coolant at inlet 15 having a temperature TP that is at or above a second setpoint temperature which is higher than the first setpoint temperature. The first and second setpoint temperatures are determined according to the mechanical properties of valve 14 which may be of conventional construction (e.g., based on wax or another phase-change material). A heavier line weight for the coolant conduits in FIG. 2 identifies portions of the coolant circuit where coolant flows during the isolated loop mode. Thus, thermostatic valve 14 is set to a position that directs any coolant received from primary energy source 11 to primary components 13 via conduit 17. In this isolated loops mode, no flow is present in either direction at outlet 22 of thermostatic valve 14. In separate auxiliary branch B, an isolated flow occurs from auxiliary pump 23 through auxiliary heating device 25, cabin heat exchanger 28, and check valve 30. Because of the conservation of mass within the cooling circuit and because there is no flow in conduit 24, no flow occurs in conduit 32. Therefore, all coolant passing through cabin heat exchanger 28 flows toward check valve 30.

With coolant temperature TP below the first temperature limit, isolated coolant flows exist in both branches A and B, so that heat energy generated by auxiliary heating device 25 is efficiently used to heat the passenger cabin. In particular, controller 35 may activate pump 23 and auxiliary heating device 25 in response to an operator command requesting cabin heating during a time when primary coolant temperature TP is below a threshold indicative of insufficient waste heat being available from primary energy source 11 to meet the heating demand. Alternatively, other sensors could be used such as a coolant temperature sensor in connection with cabin heat exchanger 28.

Figure 3:
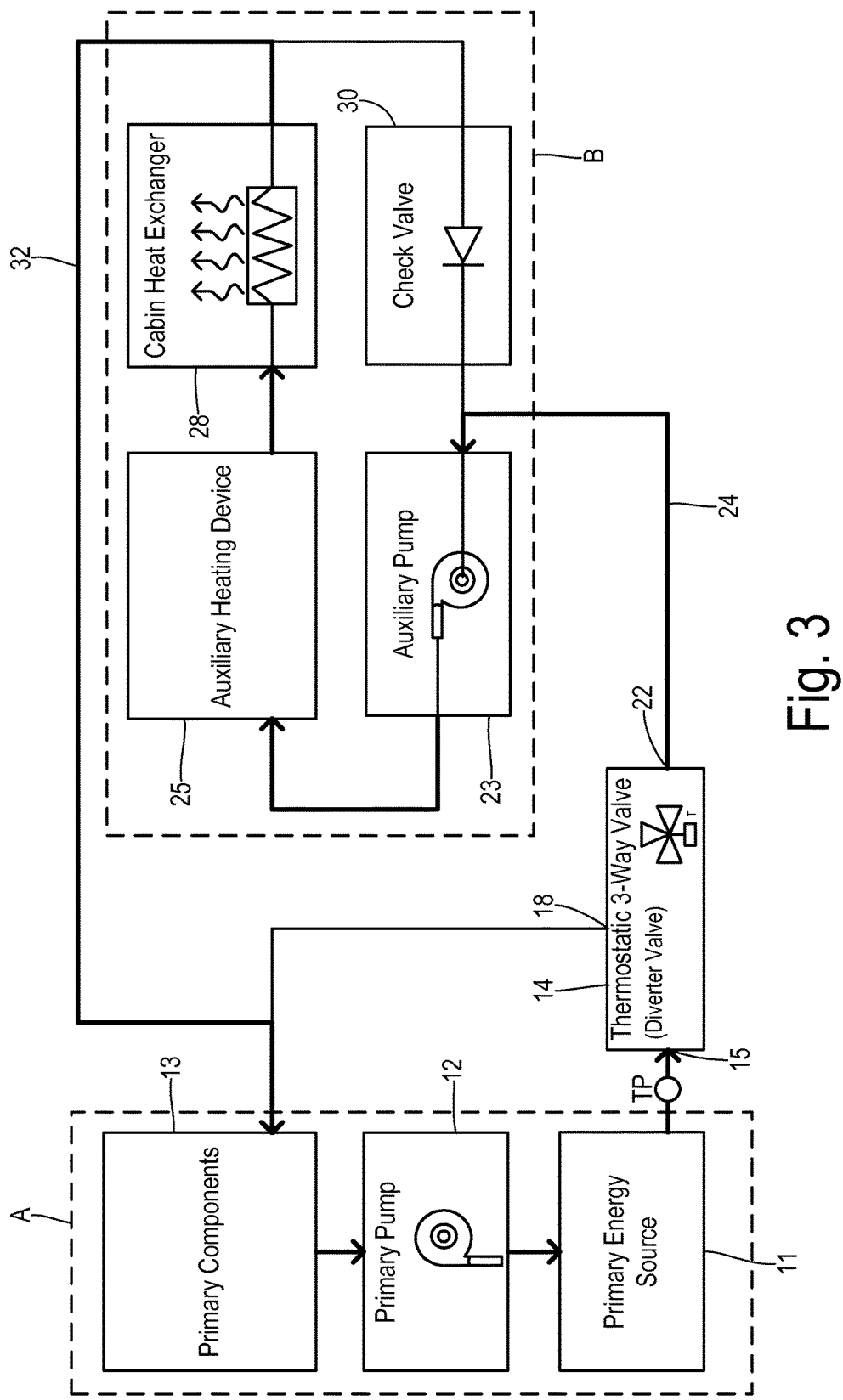
FIG. 3 illustrates coolant flow in a mixed loop mode for the embodiment of FIG. 1.

FIG. 3 illustrates coolant flow in the mixed loop (i.e., single loop) mode. When primary coolant temperature TP is greater than the second setpoint temperature then thermostatic valve 14 diverts all the coolant to second outlet 22 and to auxiliary branch B. Coolant is conveyed to a point in auxiliary branch B between auxiliary pump 23 and check valve 30 so that it follows a pathway through auxiliary pump 23, auxiliary heating device 25, and cabin heat exchanger 28 before returning to primary branch A via conduit 32. It may be desirable to turn off or reduce power to auxiliary pump 23 above some predetermined primary coolant temperature TP. The predetermined temperature may depend on the output capacity of primary pump 12 and the inherent pressure drops in the circuit, and other factors. It may have a value between the first and second set point temperatures of valve 14, for example.

By virtue of the placement of thermostatic three-way valve 14 between primary branch A and auxiliary branch B and the placement of a check valve before the auxiliary pump 23, cooling system operation achieves generally lower electrical energy consumption and better fuel economy without the necessity of expensive electronically-controlled valves. By setting the first setpoint temperature of valve 14 higher than the maximum heating of the coolant that can be generated by auxiliary heating device 25, it can be ensured that the switching of valve 14 cannot introduce a dip in cabin heating via cabin heat exchanger 28 that would otherwise result if a lower temperature coolant was allowed to be introduced. Moreover, the passenger cabin can be warmed quickly even during initial startup conditions before significant waste heat is available from primary energy source 11 since auxiliary heating device 25 supplies heat to (and must handle heat loss of) the isolated auxiliary branch only. High efficiency is maintained since primary branch A is itself isolated and can warm quickly to the point where prime energy source 11 provides excess waste energy that can be diverted for cabin warming and reduce usage of auxiliary heating device 25.

Figure 4:
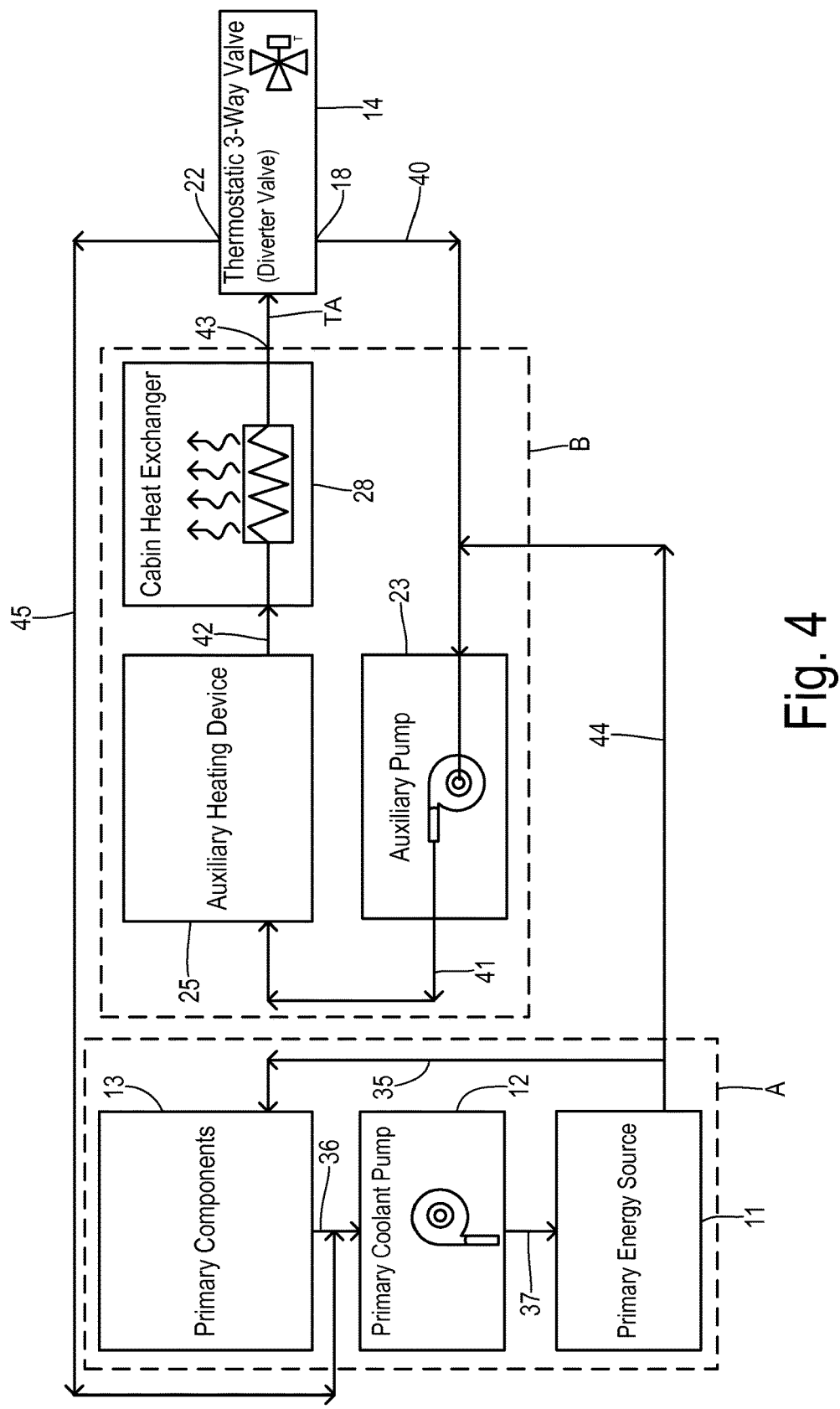
FIG. 4 is a block diagram of a heat transfer system according to a second embodiment of the invention.
Figure 5:
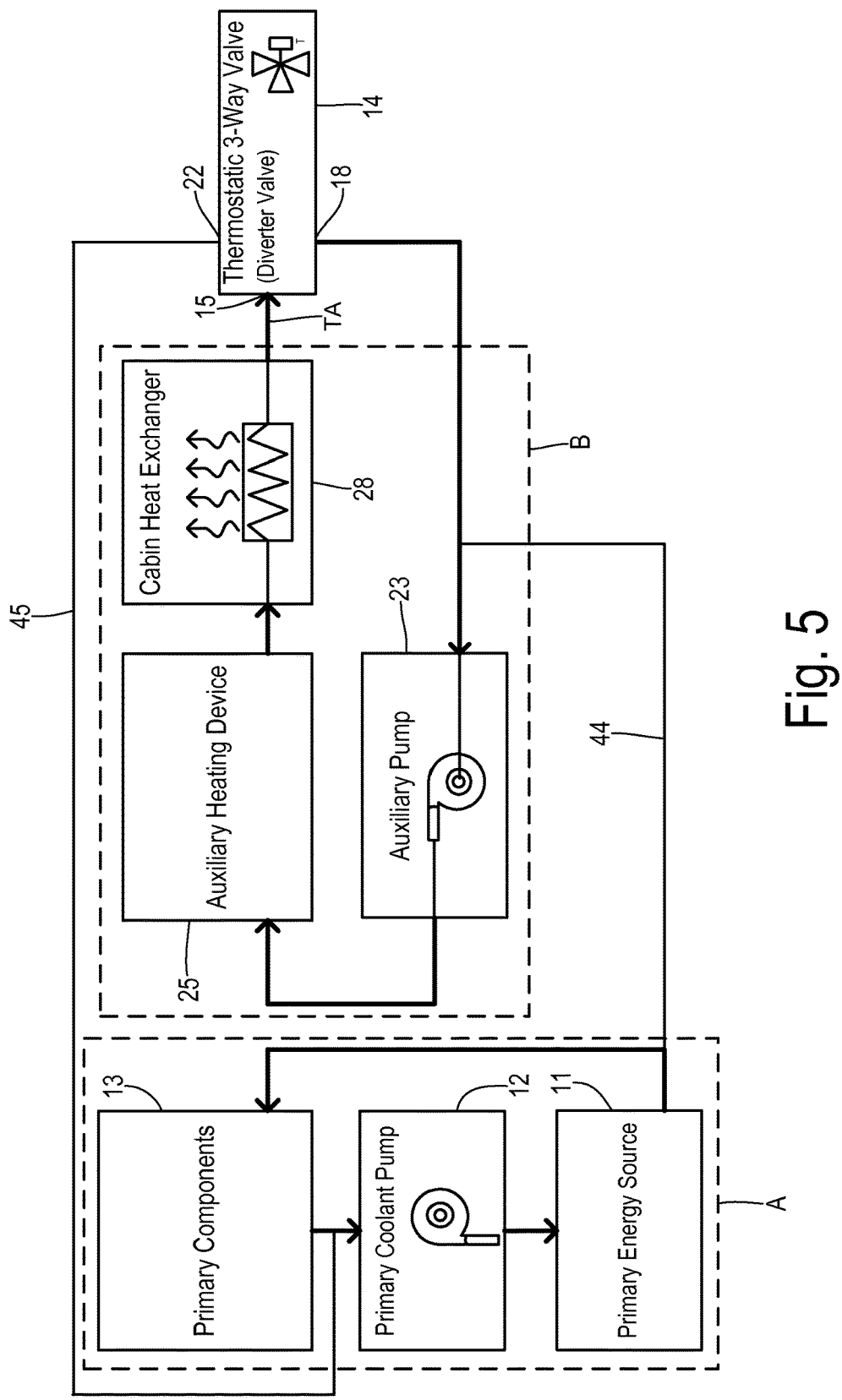
FIG. 5 illustrates coolant flow in an isolated loops mode for the embodiment of FIG. 4.
Figure 6:
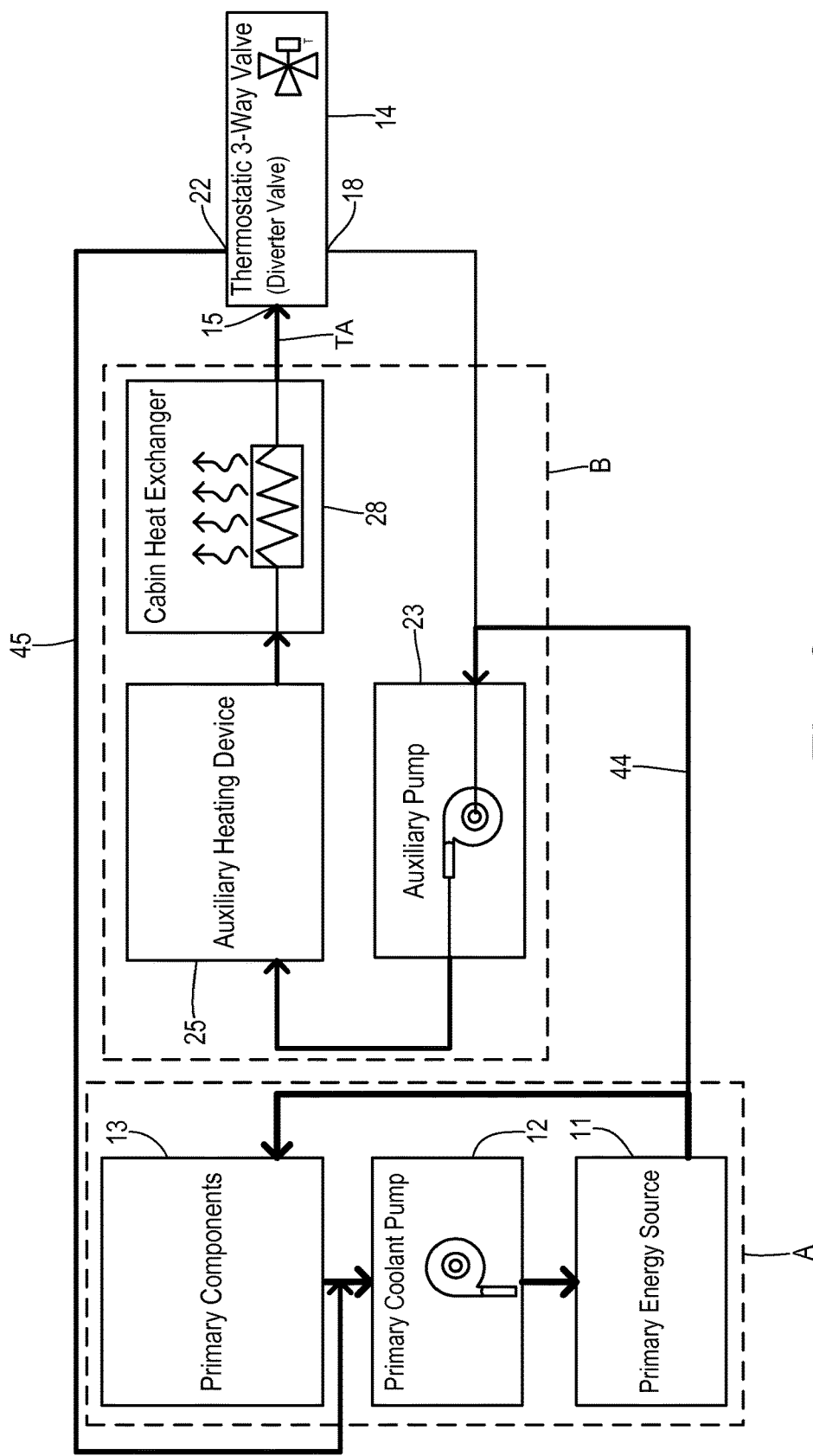
FIG. 6 illustrates coolant flow in a mixed loop mode for the embodiment of FIG. 4.

In the embodiment shown in FIGS. 1-3, thermostatic valve 14 has its inlet receiving coolant from primary branch A and has first outlet 18 configured to return coolant to the same branch (i.e., primary branch A). Second outlet 22 is configured to direct coolant to the other branch (i.e., auxiliary branch B) for the mixed loop mode. FIGS. 4-6 show an alternative embodiment for placing thermostatic three-way valve 14 with its inlet coupled to auxiliary branch B. In this embodiment, primary branch A is connected in a circular loop by conduits 35, 36, and 37. Auxiliary branch B is connected in a loop by conduits 40-43 interrupted by valve 14. Between the branches, a conduit 44 couples the outlet from primary energy source 11 to the inlet of auxiliary pump 23, and a conduit 45 couples second outlet 22 of valve 14 to the inlet of primary coolant pump 12. First outlet 18 of valve 14 is coupled to return coolant to the inlet of auxiliary pump 23 when it is receiving coolant below the first setpoint temperature, resulting in the isolated loops mode of flow shown in FIG. 5. When receiving coolant at above the second setpoint temperature, valve 14 diverts coolant flow between branches to the inlet of primary pump 12 as shown in FIG. 6. Thus, in the mixed loop mode of FIG. 6, parallel coolant flow is generated between primary heat exchange components 13 and the elements of auxiliary branch B. It should be noted that the first and second setpoints of this second embodiment are determined by an appropriate calibration in view of the particulars of each individual vehicle system, and they may have different values that for the first embodiment.

Operation of the second embodiment shown in FIGS. 4-6 is as follows. Starting with cold coolant, valve 14 is positioned to result in the isolated (dual) loops mode (FIG. 5) to provide rapid warming of the passenger cabin via auxiliary heating device 25. No flow occurs between branches A and B via conduit 44 because of the conservation of mass and because conduit 45 is blocked at second outlet 22 of valve 14. When coolant temperature TA of the auxiliary branch B entering valve 14 increases above the first setpoint temperature, valve 14 gradually changes position until the second setpoint temperature is reached. At that point, valve 14 is in a position to divert substantially all of the coolant flow into the mixed loop (single loop) mode which shares coolant heated by primary energy source 11 to both branches A and B. Advantages of the embodiment shown in FIGS. 4-6 include achieving a faster peak efficiency of primary energy source 11 as well as the other components in primary branch A, with a potential to provide lowered emissions, lower fuel consumption, and a higher peak energy output while balancing performance to achieve at least a reasonably rapid cabin heating. Elimination of the check valve results in the lowest cost compared to the other embodiments.

Figure 7:
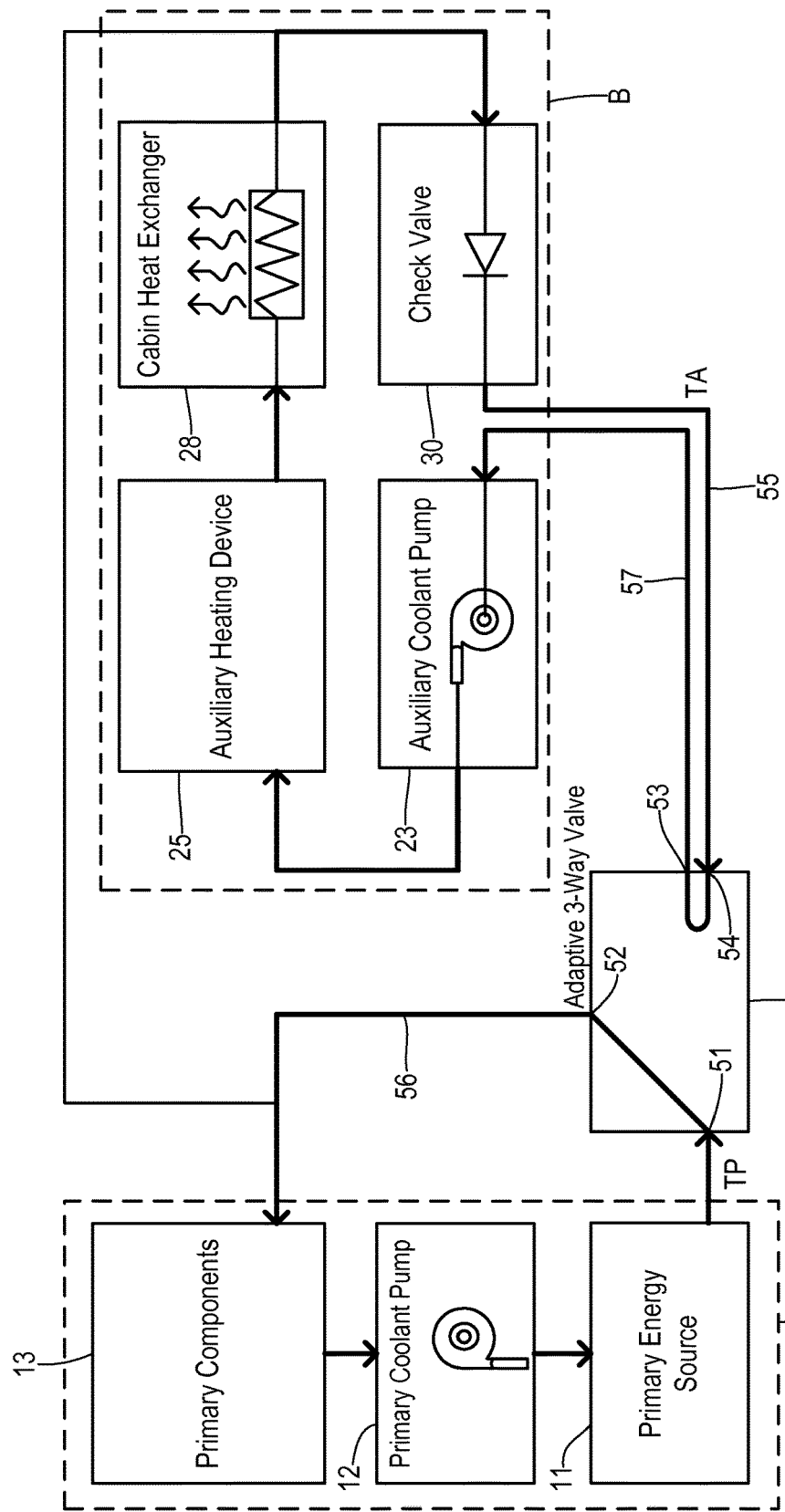
FIG. 7 is a block diagram of a heat transfer system according to a third embodiment of the invention using a dual-temperature sensing thermostatic valve, with coolant flow in an isolated (dual) loops mode.
Figure 8:
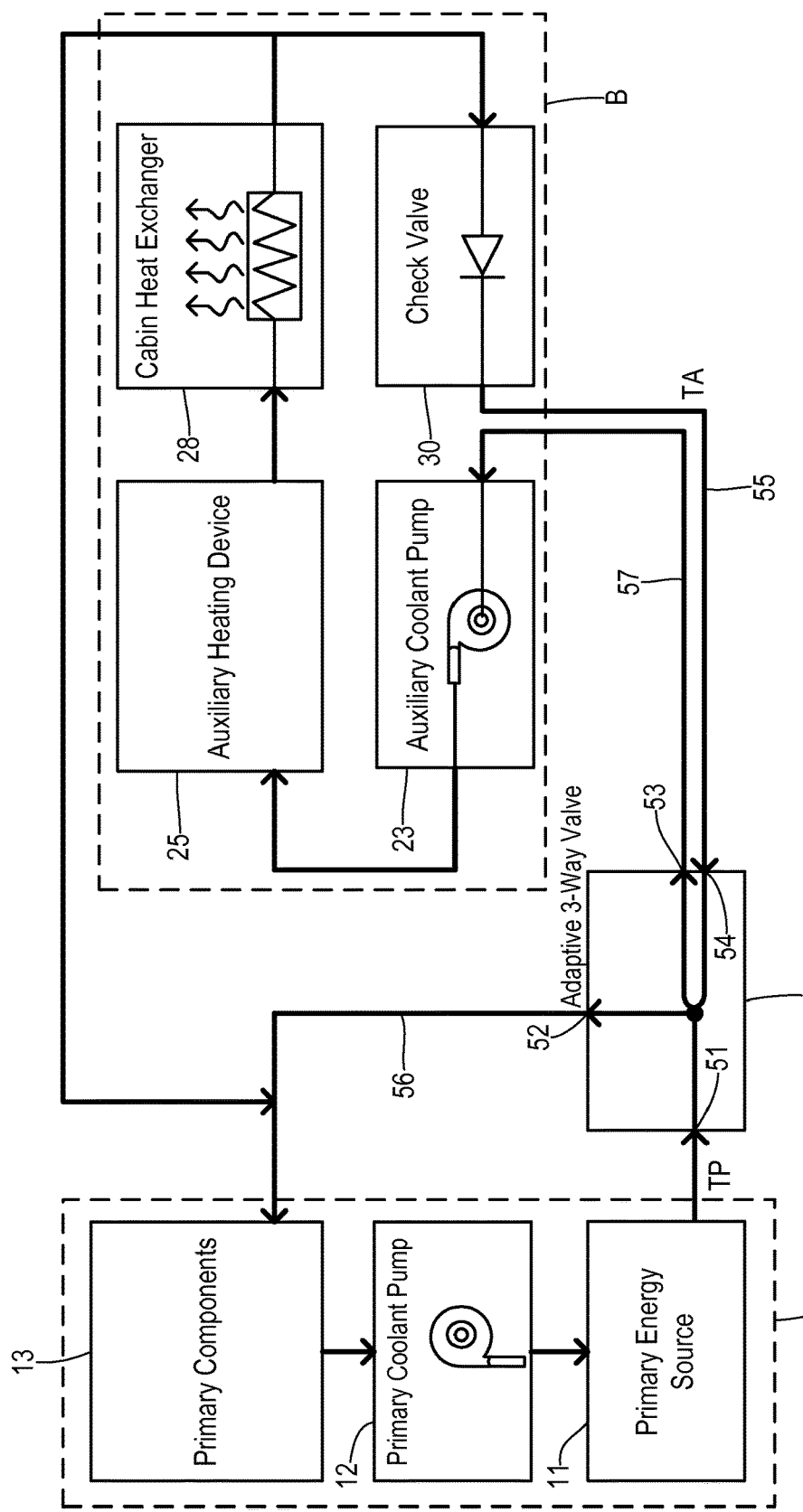
FIG. 8 illustrates coolant flow in a transition mode for the system of FIG. 7.
Figure 9:
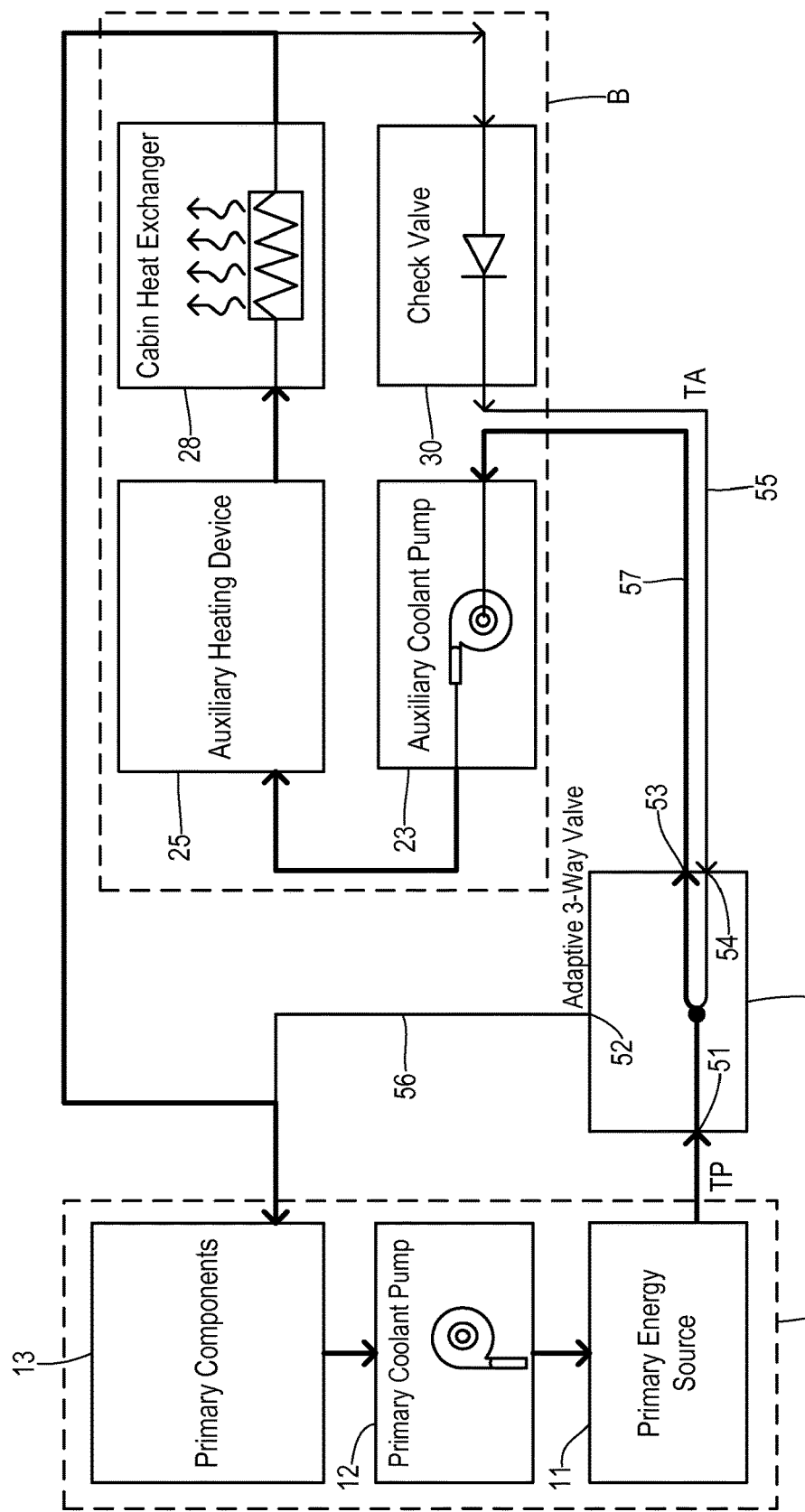
FIG. 9 illustrates coolant flow in a mixed (single) loop mode for the system of FIG. 7.

In the embodiments shown in FIGS. 1-6, complete switching-over of thermostatic valve 14 occurs between the first and second setpoint temperatures relatively quickly. As temperature increases between the setpoint temperatures, a blended flow occurs that gradually changes character between the isolated and mixed modes. FIGS. 7-9 show an embodiment similar to the first embodiment of FIGS. 1-3 wherein this transition is expanded using a dual-temperature-controlled and adaptive multi-way valve. Thus, a valve 50 has a main inlet 51, a first outlet 52, a second outlet 53, and a temperature-sensing inlet 54. Main inlet 51 receives coolant from primary energy source 11 having a temperature TP. First outlet 52 is configured to return coolant to the same branch (i.e., primary heat exchange components 13) as is connected to inlet 51. Second outlet 53 is configured to direct coolant to the other branch (i.e., auxiliary pump 23) than the one to which inlet 51 is connected. Coolant flowing in auxiliary branch B is diverted from the outlet of check valve 30 via a conduit 55 to temperature-sensing inlet 54 so that an auxiliary coolant temperature TA can be sampled by valve 50.

Heavy lines in FIG. 7 show coolant flow in the isolated loop mode when primary coolant temperature TP is less than the first setpoint temperature. Coolant circulates within primary branch A as a result of valve 50 directing coolant from inlet 51 to substantially only first outlet 52, whereby coolant returns to primary components 13 via a conduit 56. Within auxiliary branch B, coolant from check valve 30 follows a bypass to temperature-sensing inlet 54 and is then returned to auxiliary pump 23 by a conduit 57 from second outlet 53.

FIG. 8 shows a transitional or partial mixed loop mode in which coolant received at inlet 51 from primary branch A is directed to both outlets 52 and 53 in a relative proportion determined by a difference between primary coolant temperature TP and auxiliary coolant temperature TA. In this mode, coolant continues to flow through conduit 55 to maintain a balanced flow.

When primary coolant temperature TP reaches a second setpoint temperature higher than the first setpoint temperature, valve 50 moves into a condition in which substantially all coolant flow at inlet 51 is directed to second outlet 53 in the mixed (single) loop mode as shown in FIG. 9.

Figure 10:
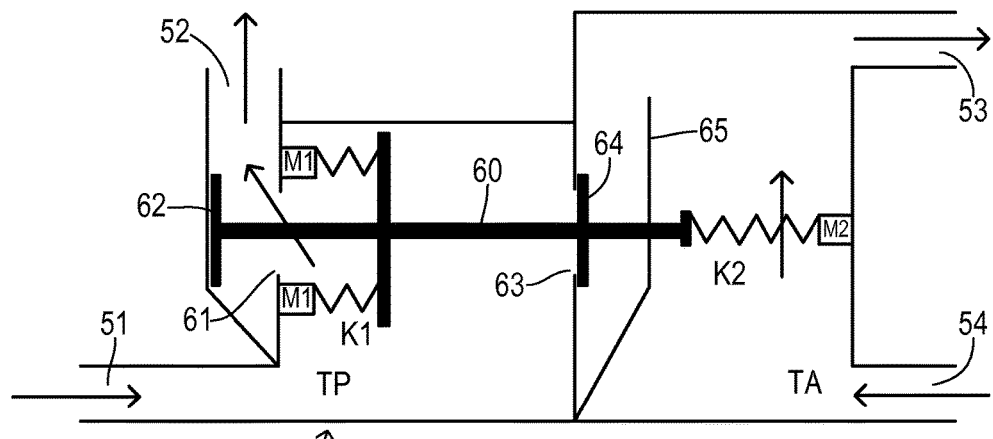
FIG. 10 is a schematic diagram of a dual-temperature sensing three-way thermostatic valve in a position corresponding to the isolated loops mode of FIG. 7.
Figure 11:
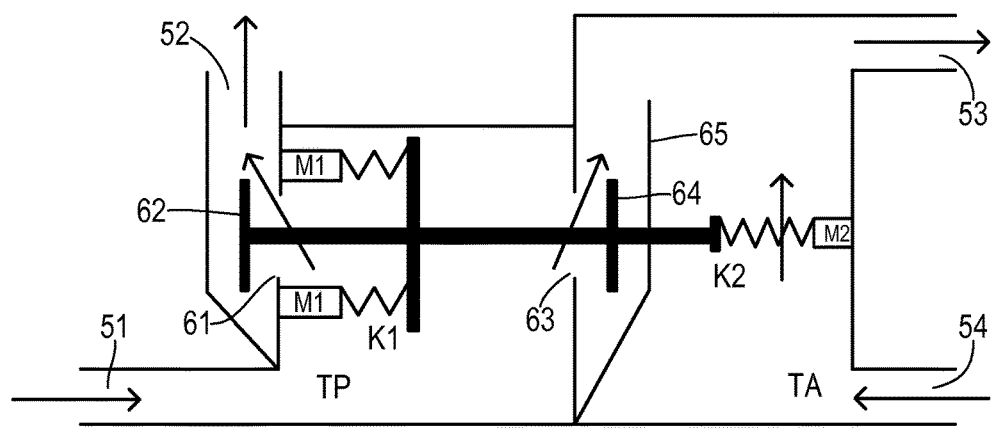
FIG. 11 is a schematic diagram of the dual-temperature sensing three-way thermostatic valve in a position corresponding to the transition mode of FIG. 8.
Figure 12:
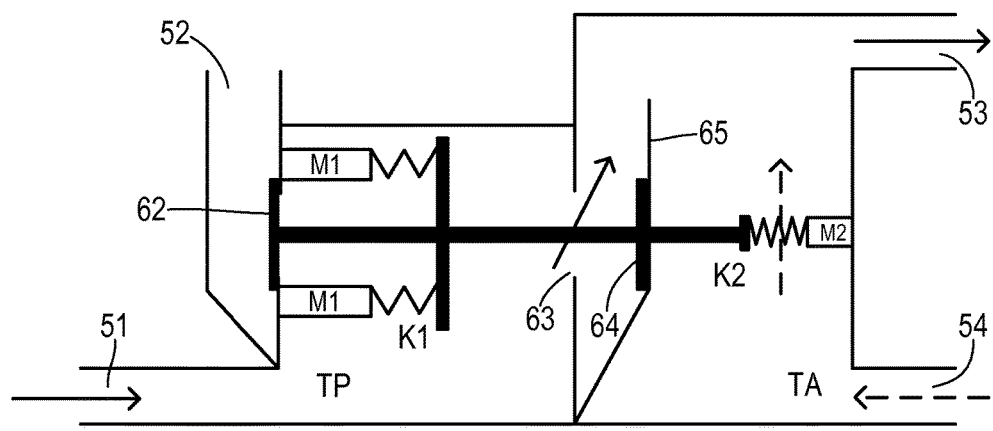
FIG. 12 is a schematic diagram of the dual-temperature sensing three-way thermostatic valve in a position corresponding to the mixed loop mode of FIG. 9.

Flow in the embodiment of FIGS. 7-9 is equivalent to the embodiment of FIGS. 1-3 except for the enhanced transitional, partial mixed loop mode shown in FIG. 8. Relative flow between the primary and auxiliary branches A and B depends on a temperature difference of the coolant entering each respective valve inlet 51 and 54. A preferred embodiment of adaptive thermostatic valve 50 is shown in FIGS. 10-12. Instead of the typical phase change material as may be used in thermostatic valve 14, thermostatic valve 50 may instead be based on use of materials exhibiting displacement that is broadly proportional to its temperature.

Thermostatic valve 50 is shown in greater detail in FIGS. 10-12. A movable valve element 60 is slidable within orifices 61 and 63. Poppets 62 and 64 carried by valve element 60 are adapted to be seated with orifices 61 and 63, respectively. At one extreme position of valve element 60 shown in FIG. 10, orifice 61 is fully open while orifice 63 is fully closed. At the other extreme position of valve element 60 shown in FIG. 12, orifice 63 is fully open while orifice 61 is fully closed. Intermediate positions of valve element 60 direct proportional flows through orifices 61 and 63 to outlets 52 and 53 as shown in FIG. 11.

In valve 50, elements M1 and M2 are actuator expansion elements, K1 and K2 describe springs with predetermined spring rates, TP is coolant temperature after the power plant, and TA is coolant temperature after the cabin heat exchanger (which is after the auxiliary heating device). Due to the action of flow divider 65, element M2 is always receiving coolant after the cabin heat exchanger.

That way diverter valve 50 will adapt its position based on HVAC airflow settings affecting coolant temperature. Valve 50 continually adapts its position to TP and TA, including changes based on power plant usage (e.g., whether in an aggressive or mild driving condition). The physical sizes and positions of elements M1 and M2, springs K1 and K2, and the specific poppet valve design are tailored to avoid buckling of the poppet valve/shaft for maximum expansions of both M1 and M2. Moreover, valve 50 is designed so that, if failed stuck in any position, there will always be flow back to power plant. If the auxiliary heating device fails, flow will be diverted to the cabin heat exchanger when TP is sufficiently warm.

The springs provide forces such that a spring rate K1 pushes toward the mixed (single) loop mode and a spring rate K2 pushes towards the isolated (dual) loops mode. This provides an offset calibration and is essential for anti-buckling force transfer. Selection of the actuator expansion materials M1 (for sensing TP) and M2 (for sensing TA) is also a key factor for calibration. The coefficient of thermal expansion of the material M1 can be chosen to exceed that of the material M2 in order to provide different valve positions based on the magnitudes of both temperatures together, in addition to the difference between both temperatures. For example, if the coefficient for M1 is designed to exceed that for M2, then as both coolant temperatures warm up, there will be an increasing tendency for the isolated loops to be converted to a mixed loop. This is useful if one wants to design for a bias towards a mixed loop as TP rises, especially if it is desired or possible for the maximum value of TA to be similar to the maximum value of TP, or other reasons. Another technique to achieve this effect would be to design K1 to exceed K2. If the coefficients of M1 and M2 are designed equal, then the valve position will be a function of the difference between both temperatures and the differences of the springs rates K1 and K2.

Starting with cold coolant, the diverter valve is positioned to result in isolated loops mode as shown in FIG. 10. Although subject to specific values of the constants M1, M2, K1, and K2, generally the valve position changes as follows. During transition conditions when temperatures are changing (e.g., during power plant startup), a partial mixed loop mode results as shown in FIG. 11. If TP warms up faster than TA, then the valve will have a tendency to position to toward mixed loop mode (FIG. 12). If TA warms up faster than TP, then the valve will have a tendency to position or stay in isolated loop mode (FIG. 10). As TP and TA approach their peak temperatures, typical design of factors will result in full mixed loop mode (FIG. 12).

The design parameters for the valve including the linear coefficient of expansion for M1, linear coefficient of expansion for M2, spring rate K1, and spring rate K2 are chosen to satisfy the specifications for any particular system. Parameter selection is facilitated by modeling valve position according to the following equation (which is valid for cases where the valve is not in an end stop position—i.e., only where the valve is floating):

$$X3P = \frac{K1*[X3+\{LM1*AM1*(TM1P-TM1)\}] - K2*[-X3+\{LM2*AM2*(TM2P-TM2)\}]}{(K1+K2)}$$

where:
X1=initial position of spring end of M1 (M1 is actuator expansion element in TP section of coolant)
X2=final position of spring end of M1

X3P=final valve position
X3=initial valve position
X4=final position of spring end of M2 (M2 is actuator expansion element in TA section of coolant)
X5=initial position of spring end of M2
LM1=initial length of M1
LM2=initial length of M2
AM1=linear coefficient of expansion of M1
AM2=linear coefficient of expansion of M2
K1=spring constant for spring 1 in TP section of coolant
K2=spring constant for spring 2 in TA section of coolant
TM1=initial coolant temperature of TP section of coolant
TM1P=final coolant temperature of TP section of coolant
TM2=initial coolant temperature of TA section of coolant
TM2P=final coolant temperature of TA section of coolant This equation can be used to determine valve position for a variety of changes to design parameters under a variety of coolant temperatures for TA and TP sections of coolant. Note that it is also possible to design the valve with nonlinear spring rates, which would be a different equation.

As a result of the arrangement of valve 50, isolated loop mode will only be converted to mixed loop when the primary energy source coolant temperature TP is sufficiently warm (i.e., above the first setpoint) to result in flow diversion towards the cabin heat exchanger. Should the primary energy source coolant temperature later drop (e.g., due to auto engine off in a start-stop engine, an extended idle, or a hill descent), the mixed loop will automatically convert back to isolated loops. Should the primary energy source temperature TP later increase sufficiently (e.g., due to resumed driving, down-shifting, or hill ascent), the isolated loops will then be converted back to a mixed loop to take advantage of that waste heat. One can also choose to set the upper coolant temperature control limit for the auxiliary heating device output to be lower than the maximum expected TP, so that at peak steady-state coolant temperatures the primary heating device coolant will be serially directed to the cabin heat exchanger resulting in mixed loop mode.

The embodiment of FIG. 7-9 utilizes a thermostatic valve slightly more expensive than the first and second embodiments. However, this embodiment may provide fastest cabin heating by diverting coolant for the cabin heat exchanger based on the hottest available coolant in real time. By using a temperature difference to control the relative flow between isolated and mixed modes, the delivery of heat to the cabin heat exchanger is automatically adaptable and optimized to different drive cycles and external conditions in which the vehicle is operated. As in the first embodiment, in the event of failure of the auxiliary heating device, a warm coolant flow will eventually be diverted to the heat exchanger once the primary coolant temperature is sufficiently warm. This third embodiment likewise achieves lower electrical energy consumption and better fuel economy by allowing the auxiliary coolant pump to be turned off at higher coolant temperatures.

What is claimed is:

1. A heat transfer system for a road vehicle having a passenger cabin, wherein a coolant circulates within the system, comprising:
   a primary branch including a primary coolant pump and a primary power plant that heats the coolant to a primary temperature, and wherein coolant is pumped through the primary power plant by the primary coolant pump;
   an auxiliary branch including an auxiliary coolant pump, an auxiliary heat source, and a cabin heat exchanger, wherein the auxiliary heat source selectably transfers heat to the coolant flowing within the auxiliary branch, wherein coolant flowing within the auxiliary branch has an auxiliary temperature; and a mechanically-actuated thermostatic multi-way valve having a valve inlet and first and second valve outlets, wherein the thermostatic multi-way valve directs coolant from the valve inlet to substantially only the first valve outlet when receiving coolant at below a first temperature, wherein the valve directs coolant from the valve inlet to substantially only the second valve outlet when receiving coolant at above a second temperature, wherein the second temperature is higher than the first temperature, wherein the valve inlet is coupled to receive coolant from one of the primary branch or the auxiliary branch, wherein the first valve outlet is configured to return coolant to the same branch as is connected to the valve inlet, and wherein the second valve outlet is configured to direct coolant to the other branch to which the valve inlet is not connected.

2. The system of claim 1 wherein the primary branch includes primary heat exchange components coupled in series with the primary pump and the primary power plant.

3. The system of claim 2 wherein the primary heat exchange components include a radiator.

4. The system of claim 2 wherein the valve inlet is coupled to the primary branch to receive coolant after being heated by the primary power plant, wherein the first outlet is coupled to the primary heat exchange components, and wherein the second outlet is coupled to the auxiliary pump.

5. The system of claim 4 wherein the auxiliary branch further includes a check valve with an inlet receiving coolant from the cabin heat exchanger and an outlet delivering coolant to the auxiliary pump.

6. The system of claim 5 wherein the thermostatic multi-way valve is a dual-temperature controlled valve further including a temperature sensing inlet receiving coolant from the check valve and returning it to the auxiliary pump, wherein the thermostatic multi-way valve directs coolant received from the primary branch to both the first and second outlets in a relative proportion determined by a difference between the primary temperature of coolant entering the valve inlet and an auxiliary temperature of coolant entering the temperature sensing inlet.

7. The system of claim 2 wherein the valve inlet is coupled to the auxiliary branch to receive coolant from the cabin heat exchanger, and wherein the second outlet is coupled to the primary coolant pump.

8. The system of claim 7 wherein the first outlet is coupled to the auxiliary pump.

9. The system of claim 7 wherein the primary coolant pump receives parallel coolant flows from the primary heat exchange components and the cabin heat exchanger when the valve directs coolant to the second outlet.

10. A method for providing heat transfer in a road vehicle having a passenger cabin, wherein a coolant circulates within the system, the method comprising the steps of:

providing a primary branch including a primary coolant pump and a primary power plant that heats the coolant to a primary temperature, and wherein coolant is pumped through the primary power plant by the primary coolant pump;

providing an auxiliary branch including an auxiliary coolant pump, an auxiliary heat source, and a cabin heat exchanger, wherein the auxiliary heat source selectably transfers heat to the coolant flowing within the auxiliary branch, wherein coolant flowing within the auxiliary branch has an auxiliary temperature;

coupling the primary and auxiliary branches together via a mechanically-actuated thermostatic multi-way valve having a valve inlet and first and second valve outlets, wherein the thermostatic multi-way valve directs coolant from the valve inlet to substantially only the first valve outlet when receiving coolant at below a first temperature, wherein the thermostatic multi-way valve directs coolant from the valve inlet to substantially only the second valve outlet when receiving coolant at above a second temperature, wherein the second temperature is higher than the first temperature, wherein the valve inlet is coupled to receive coolant from one of the primary branch or the auxiliary branch, wherein the first valve outlet is configured to return coolant to the same branch as is connected to the valve inlet, and wherein the second valve outlet is configured to direct coolant to the other branch to which the valve inlet is not connected;

circulating the coolant separately as isolated loops in the primary branch and the auxiliary branch when coolant received by the valve inlet is below the first temperature; and circulating the coolant as a mixed loop in the primary branch and the auxiliary branch together when coolant received by the valve inlet is above the second temperature.

11. The method of claim 10 further comprising the step of:
circulating the coolant as a partial mixed loop in the primary branch and the auxiliary branch together when coolant received by the valve inlet is between the first temperature and the second temperature.

12. The method of claim 10 wherein the primary branch includes primary heat exchange components coupled in series with the primary pump and the primary power plant.

13. The method of claim 12 wherein the primary heat exchange components include a radiator.

14. The method of claim 12 wherein the valve inlet is coupled to the primary branch to receive coolant after being heated by the primary power plant, wherein the first outlet is coupled to the primary heat exchange components, and wherein the second outlet is coupled to the auxiliary pump.

15. The method of claim 14 wherein the auxiliary branch further includes a check valve with an inlet receiving coolant from the cabin heat exchanger and an outlet delivering coolant to the auxiliary pump.

16. The method of claim 15 wherein the thermostatic multi-way valve is a dual-temperature controlled valve further including a temperature sensing inlet receiving coolant from the check valve and returning it to the auxiliary pump, wherein the thermostatic multi-way valve directs coolant received from the primary branch to both the first and second outlets in a relative proportion determined by a difference between the primary temperature of coolant entering the valve inlet and the auxiliary temperature of coolant entering the temperature sensing inlet.

17. The method of claim 12 wherein the valve inlet is coupled to the auxiliary branch to receive coolant from the cabin heat exchanger, and wherein the second outlet is coupled to the primary coolant pump.

18. The method of claim 17 wherein the first outlet is coupled to the auxiliary pump.

19. The method of claim 17 wherein the primary coolant pump receives parallel coolant flows from the primary heat exchange components and the cabin heat exchanger when the valve directs coolant to the second outlet.

* * * * *